United States Patent [19]
Bhat

[11] Patent Number: 5,603,798
[45] Date of Patent: Feb. 18, 1997

[54] TWO-PART MOISTURE CURABLE POLYURETHANE ADHESIVE

[75] Inventor: Shailesh S. Bhat, Troy, Mich.

[73] Assignee: The Dow Chemical Company, Midland, Mich.

[21] Appl. No.: 646,562

[22] Filed: May 8, 1996

Related U.S. Application Data

[60] Continuation of Ser. No. 582,828, Jan. 4, 1996, abandoned, which is a division of Ser. No. 373,146, Jan. 13, 1995, abandoned.

[51] Int. Cl.$^6$ .......................... C09J 4/00; C09J 101/00; C09J 201/00; B31B 1/60
[52] U.S. Cl. .................. 156/331.4; 156/60; 156/327; 156/330.9; 156/331.1; 156/331.5; 156/331.7; 524/445; 524/590; 528/59; 528/60; 528/65; 528/66; 528/73
[58] Field of Search ................. 524/445, 590; 528/59, 60, 65, 66, 73; 156/60, 327, 330.9, 331.1, 331.4, 331.5, 331.7

[56] References Cited

U.S. PATENT DOCUMENTS

| | | | |
|---|---|---|---|
| 3,325,421 | 6/1967 | Muller | 528/68 |
| 3,743,626 | 7/1973 | Emmons | 260/77.5 AQ |
| 4,002,601 | 1/1977 | Hajek et al. | 260/77.5 |
| 4,093,569 | 6/1978 | Reischl et al. | 260/2.5 |
| 4,118,376 | 10/1978 | Pedain et al. | 528/59 |
| 4,138,545 | 2/1979 | Emmons et al. | 428/425 |
| 4,148,840 | 4/1979 | Shah | 521/137 |
| 4,192,937 | 3/1980 | Noll et al. | 528/59 |
| 4,193,832 | 3/1980 | Reischl et al. | 156/331 |
| 4,373,082 | 2/1983 | Kimball et al. | 528/60 |
| 4,390,645 | 6/1983 | Hoffman et al. | 521/137 |
| 4,396,681 | 8/1983 | Rizk et al. | 428/423.1 |
| 4,463,107 | 7/1984 | Simroth et al. | 521/137 |
| 4,574,137 | 3/1986 | Serratelli et al. | 524/724 |
| 4,728,710 | 3/1988 | Goel | 528/58 |
| 4,758,648 | 7/1988 | Rizk et al. | 528/53 |
| 4,985,491 | 1/1991 | Reisch | 524/875 |
| 5,126,521 | 6/1992 | Majewski et al. | 528/44 |
| 5,143,995 | 9/1992 | Meckel et al. | 528/59 |
| 5,194,488 | 3/1993 | Piestert et al. | 524/703 |
| 5,219,979 | 6/1993 | Greco | 528/220 |

FOREIGN PATENT DOCUMENTS

| | | |
|---|---|---|
| 2049695 | 2/1993 | Canada . |
| 508430 | 10/1992 | European Pat. Off. . |
| WO92/13907 | 8/1992 | WIPO . |

OTHER PUBLICATIONS

Emmons, W. D., et al., "High Performance Isocyanate–Oxazolidine Coatings," *J. Coatings Tech.*, vol. 49, No. 631, Aug. 1977, pp. 65–73.

*Primary Examiner*—Paul R. Michl
*Assistant Examiner*—Patrick Niland
*Attorney, Agent, or Firm*—Norman L. Sims

[57] ABSTRACT

The invention is the process for binding two substrates together using a two-part adhesive comprising as a first part:
  A. a polyurethane prepolymer having reactive isocyanate moieties;
and a second part
  B. a curative composition comprising
    i) a polyurea, comprising the reaction product of a polyamine and a polyisocyanate, dispersed in a polyether polyol-based polyurethane prepolymer having reactive hydroxyl moieties, and optionally a plasticizer;
    ii) a compound having at least one oxazolidine moiety capable of reacting with an isocyanate under curing conditions; and
    iii) a catalyst capable of catalyzing the reaction of isocyanate and hydroxyl moieties in the presence of moisture.

8 Claims, No Drawings

TWO-PART MOISTURE CURABLE POLYURETHANE ADHESIVE

CROSS-REFERENCE TO RELATED APPLICATION

This is a continuation of application Ser. No. 08/582,828, filed Jan. 4, 1996 now abandoned, which is a divisional of application Ser. No. 08/373,146 filed Jan. 13, 1995 now abandoned.

BACKGROUND OF THE INVENTION

This application relates to a two-part polyurethane based adhesive useful in bonding porous and nonporous materials. The adhesive is especially useful in bonding glass into window frames, for example windshields into automobiles.

Polyurethane adhesive compositions typically comprise at least one urethane prepolymer. Adhesives useful for bonding to nonporous substrates, such as glass, to metal, are well known (see U.S. Pat. Nos. 4,374,237 and 4,687,533 incorporated herein by reference). When glass is installed in automobiles on a production line, a one-part moisture curable polyurethane adhesive is preferably used, as the equipment needed for the application of such an adhesive in an automobile assembly plant is less expensive than the equipment needed to apply a two-part adhesive. One part polyurethane adhesives are disclosed in U.S. Pat. Nos. 4,374,237 and 4,687,533.

In the automotive after market replacement industry, glass is often bound into automobiles through the use of two-part moisture curable polyurethane adhesives. Two-part polyurethane adhesives are used because they offer rapid initial cure allowing for rapid drive-away times. Two-part polyurethane adhesives are well known, see for example U.S. Pat. No. 4,835,012, incorporated herein by reference, and DE 4,210,277. Despite the relatively rapid drive-away times afforded by two-part polyurethane adhesives, the market demands faster curing adhesives which allow even faster drive away times, for instance about 60 minutes from application and more preferably about 30 minutes from application. If the adhesive cures too rapidly, then the window installer loses the necessary time to install and properly place the glass into the frame before the adhesive becomes too intractable to work with. Working time is defined as the period from application of adhesive until the adhesive becomes too intractable to work with, and is preferably about 10 to 12 minutes.

Future regulations in the U.S. will require dual airbags in vehicles. During crashes the airbags inflate and exert additional pressure on the windshield. Federal Transportation Agency regulations require that windshield remain in place at crashes of up to 30 mph (48 KPH). This requires adhesives which have enhanced strength at the drive away time. To meet such a standard, the lap shear strengths of the adhesive should be preferably 150 psi (1033 kPa) at the designated drive away time as determined according to ASTM D-3163.

Therefore, what is needed is a two-part polyurethane adhesive which facilitates faster drive away time, which meets the strength requirements defined above and which still provides for a reasonable working time to facilitate proper placement of glass in window frames.

SUMMARY OF THE INVENTION

The invention is a two-part adhesive comprising as a first part:
A. a polyurethane prepolymer having reactive isocyanate moieties;
and a second part
B. a curative composition comprising
  i) a polyurea, comprising the reaction product of a polyamine and a polyisocyanate, dispersed in a polyether polyol-based polyurethane prepolymer having reactive hydroxyl moieties, and optionally a plasticizer;
  ii) a compound having at least one oxazolidine moiety capable of reacting with an isocyanate under curing conditions; and
  iii) a catalyst capable of catalyzing the reaction of isocyanate and hydroxyl moieties in the presence of moisture.

In another embodiment the invention is a process for binding two substrates together which comprises:
  i) contacting a portion of part A with a portion of part B of the adhesive composition described hereinbefore;
  ii) applying the mixture of part A and part B to a first substrate;
  iii) contacting a second substrate with the mixture of part A and part B previously applied to the first substrate under conditions such that the mixture cures and binds the first substrate to the second substrate.

The adhesive of this invention provides reasonable drive away times for replacement glass it binds into automobiles. Such drive away times are preferably about 60 minutes and more preferably about 30 minutes from application of the adhesive. The adhesive of the invention also provides reasonable working times, about 10 to 12 minutes. Additionally the lap shear strengths of the adhesive at the drive away time is preferably about 150 psi (1033 kPa) and more preferably about 250 psi (1723 kPa) according to ASTM D-3163.

DETAILED DESCRIPTION OF THE INVENTION

Suitable isocyanate-containing urethane prepolymers for use in part A include any compound having an average isocyanate functionality of at least about 0.7 and a molecular weight of at least about 2,000. Preferably, the average isocyanate functionality of the prepolymer is at least about 0.7, more preferably at least about 0.9 and even more preferably 1.2 or greater. Preferably the isocyanate functionality of the prepolymer is 2.0 or less and more preferably 1.4 or less. Preferably, the molecular weight of the prepolymer is at least about 2,500 and more preferably at least about 3,000; and is preferably no greater than about 20,000, more preferably no greater than about 15,000 and most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer.

Preferable polyisocyanates for use in preparing the prepolymer include any aliphatic, cycloaliphatic, arylaliphatic, heterocyclic or aromatic polyisocyanate, or mixture thereof, with an average isocyanate functionality of at least about 2.0 and an equivalent weight of at least about 80. Preferably, the isocyanate functionality of the polyisocyanate is at least about 2.0, more preferably at least about 2.2, and is more preferably at least about 2.3; and is preferably no greater than about 4.0, more preferably no greater than about 3.5, and is most preferably no greater than about 3.0. Higher functionalities may also be used, but may cause excessive crosslinking, and result in an adhesive which is too viscous to handle and apply easily, and can cause the cured adhesive to be too brittle. Preferably, the equivalent weight of the polyisocyanate is at least about 100, more preferably at least about 110, and is more preferably at least about 120; and is preferably no greater than about 300, more preferably no greater than about 250, and is most preferably no greater than about 200.

Examples of such polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'-and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4''-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385. Preferably the polyisocyanate is an aromatic or cycloaliphatic polyisocyanate such as diphenylmethane-4,4'-diisocyanate, isophorone diisocyanate, tetramethylxylene diisocyanate, and is most preferably diphenylmethane-4,4'-diisocyanate.

The term "isocyanate-reactive compound" as used herein includes any organic compound having at least two, and preferably no more than about 4, isocyanate-reactive moieties, such as a compound containing an active hydrogen moiety or an imino-functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —NH$_2$, —NH—, —CONH$_2$, —SH, and —CONH—. Typical active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate-reactive compound is a polyol, and is more preferably a polyether polyol.

Suitable polyols useful in the preparation of the prepolymers useful in part A include, for example, polyether polyols, polyester polyols, poly(alkylene carbonate)polyols, hydroxyl-containing polythioethers, polymer polyols, and mixtures thereof. Polyether polyols are well-known in the art and include, for example, polyoxyethylene, polyoxypropylene, polyoxybutylene, and polytetramethylene ether diols and triols which are prepared by reacting an unsubstituted or halogen- or aromatic-substituted alkylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerine with propylene oxide, followed by reacting with ethylene oxide.

Preferable alkylene oxides include ethylene oxide, propylene oxide, butylene oxides, styrene oxide, PO epichlorohydrin, epibromohydrin, and mixtures thereof. Preferable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of preferable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, and mixtures thereof. Examples of preferable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Preferable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference.

Preferably, the isocyanate-reactive compound has a functionality of at least about 1.5, more preferably at least about 1.8 and most preferably at least about 2.0; and is preferably no greater than about 4.0, more preferably no greater than about 3.5 and most preferably no greater than about 3.0. Preferably, the equivalent weight of the isocyanate-reactive compound is at least about 200, more preferably at least about 500 and more preferably at least about 1,000; and is preferably no greater than about 3,500, more preferably no greater than about 3,000 and most preferably no greater than about 2,500.

The isocyanate containing prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent crosslinking of the isocyanate groups by atmospheric moisture. The reaction is preferably carried out at a temperature between 0° C. and 150° C., preferably between 25° C. and 80° C., until the residual isocyanate content determined by titration of a sample is very close to the desired theoretical value. The isocyanate content in the prepolymers is preferably in the range of 1.0 percent to 15 percent, more preferably in the range of 1.5 percent to 10.0 percent, even more preferably in the range of 1.5 percent to 5.0 percent and most preferably in the range of 1.8 percent to 3.0 percent.

The isocyanate-containing urethane prepolymers are present in part A in an amount sufficient such that when mixed with part B the resulting adhesive cures to sufficiently bond substrates together. Preferably the lap shear strengths of bonds so formed is about 150 psi (1033 kPa) or greater is achieved after about 60 minutes and more preferably after about 30 minutes. Preferably the isocyanate-containing polyurethane prepolymers of part A are present in an amount of 55 parts by weight of part A or greater, and more preferably 65 parts by weight of part A or greater. Preferably the isocyanate-containing polyurethane prepolymers of part A are present in an amount of about 85 parts by weight of part A or less, more preferably about 83 parts by weight of part A or less and even more preferably 75 parts by weight or less. Part A of the adhesive of the invention may be formulated with fillers and additives known in the prior art for use in elastomeric compositions. By the addition of such materials physical properties such as viscosity flow rates and the like can be modified. However, to prevent premature hydrolysis of the moisture sensitive groups of the polyurethane prepolymer, fillers should be thoroughly dried before admixture therewith.

Optional components for part A of the adhesive of the invention include reinforcing fillers. Such reinforcing fillers increase the ultimate strength of the adhesive and may improve the thixotropic properties. Such fillers are well known to those skilled in the art and include carbon black, titanium dioxide, calcium carbonate, surface treated silicas, titanium oxide, fume silica, talc, and the like. Preferred reinforcing fillers comprise carbon black. In one embodiment, more than one reinforcing filler may be used, of which one is carbon black and in such embodiment, a sufficient amount of carbon black is used to provide the desired black color to part A. The reinforcing fillers are used in sufficient amount to increase the strength of the adhesive and to provide thixotropic properties to part A. Preferably the reinforcing filler is present in an amount of about 1 part by weight of part A or greater, more preferably 15 parts by weight of part A or greater and most preferably 17 parts by weight of part A or greater. Preferably the reinforcing filler is present in an amount of about 40 parts by weight of part A or less, more preferably 25 parts by weight of part A or less and most preferably 23 parts by weight of part A or less.

Among optional materials in part A of the adhesive formulation are clays. Preferred clays useful in the invention include kaolin, surface treated kaolin, calcined kaolin, aluminum silicates and surface treated anhydrous aluminium silicates. The clays can be used in any form which facilitates formulation of a pumpable adhesive. Preferably the clay is in the form of pulverized powder, spray dried beads and finely ground particles. Clays may be used in an amount of 0 parts by weight of part A or greater, more preferably 1 part by weight of part A or greater and even more preferably 6 parts by weight of part A or greater. Preferably the clays are used in an amount of 20 parts by weight or less of part A and more preferably 10 parts by weight or less.

Part A of the adhesive composition of the invention may further comprise a catalyst known for promoting the cure of polyurethanes in the presence of moisture. Preferable catalysts include metal salts such as tin carboxylates, organo silicon titanates, alkyl titanates, bismuth carboxylates, and dimorpholinodiethyl ether or alkyl substituted dimorpholinodiethyl ethers. Among preferred catalysts are bismuth octoate, dimorpholinodiethyl ether and (di-(2-(3,5-dimethylmorpholino)ethyl)) ether. Such catalysts, when employed are preferably employed in an amount based on the weight of part A of about 0.1 parts by weight or greater, more preferably about 0.2 parts by weight or greater and more preferably about 0.4 parts by weight or greater. Such catalysts are preferably employed in an amount, based on the weight of part A, of about 5 parts by weight or less, more preferably about 1.75 parts by weight or less, even more preferably about 1 part by weight or less and most preferably about 0.6 parts by weight or less.

Part A of the adhesive composition of this invention may further comprise plasticizers so as to modify the rheological properties to a desired consistency. Such materials should be free of water, inert to isocyanate groups and compatible with a polymer. Suitable plasticizers are well known in the art and preferable plasticizers include alkyl phthalates such as dioctylphthalate or dibutylphthalate, partially hydrogenated terpene commercially available as "HB-40", trioctyl phosphate, epoxy plasticizers, toluene-sulfamide, chloroparaffins, adipic acid esters, castor oil, toluene and alkyl naphthalenes. The amount of plasticizer in part A is that amount which gives the desired rheological properties of part A. Preferably plasticizers are used in part A in an amount of about 0 parts by weight or greater based on the weight of part A, more preferably about 10 parts by weight or greater and more preferably about 30 parts by weight or greater, and most preferably about 35 parts by weight or greater. The plasticizer is preferably used in an amount of about 40 parts by weight or less based on the total amount of part A and more preferably about 35 parts by weight or less.

Part A of the adhesive of this invention may further comprise stabilizers which function to protect the adhesive composition from moisture, thereby inhibiting advancement and preventing premature crosslinking of the isocyanates in the adhesive formulation. Included among such stabilizers are diethylmalonate and alkylphenol alkylates. Such stabilizers are preferably used in an amount of about 0.1 parts by weight or greater based on the total weight of part A, preferably about 0.5 parts by weight or greater and more preferably about 0.8 parts by weight or greater. Such stabilizers are used in an amount of about 5.0 parts by weight or less based on the weight of part A, more preferably about 2.0 parts by weight or less and most preferably about 1.4 parts by weight or less.

Other components commonly used in adhesive compositions may be used in part A of the adhesive composition of this invention. Such materials are well known to those skilled in the art and may include ultraviolet stabilizers and antioxidants and the like.

As used herein all parts by weight relative to the components of Part A are based on 100 total parts by weight of part A.

Part A of the adhesive composition of this invention may be formulated by blending the components together using means well known in the art. Generally the components are blended in a suitable mixer, such as a Hockmeier mixer. Such blending is preferably conducted in an inert atmosphere in the absence of oxygen and atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components in part A. Once part A is formulated, it is packaged in a suitable container such that is protected from atmospheric moisture and oxygen. Contact with atmospheric moisture and oxygen could result in premature crosslinking of the polyurethane prepolymer-containing isocyanate groups.

Optionally part A of the adhesives of the invention may further comprise a thixotrope. Such thixotropes are well known to those skilled in the art and include alumina, limestone, talc, zinc oxides, sulfur oxides, calcium carbonate, perlite, slate flour, salt (NaCl), cyclodextrin and the like. The thixotrope may be added to part A of the adhesive of the invention in a sufficient amount to give the desired rheological properties. Preferably the thixotrope is present in an amount of about 0 parts by weight or greater based on the weight of part A, preferably about 1 part by weight or greater. Preferably the optional thixotrope is present in an amount of about 10 parts by weight or less based on the weight of part A and more preferably about 2 parts by weight or less.

The second part of the adhesive composition of the invention referred to herein as part B is a curative composition which comprises a polyurea, comprising the reaction product of a polyamine and a polyisocyanate, dispersed in a polyurethane prepolymer having reactive hydroxyl moieties (hereinafter hydroxyl-containing prepolymer) which is derived from 1 or more polyether polyols and 1 or more polyisocyanates, wherein such dispersion optionally contains plasticizers. The polyurea preferably does not react with hydroxyl moieties. The polyurea is prepared by the reaction of a polyamine, preferably a diamine, with a polyisocyanate, preferably a diisocyanate. The polyurea and polyamine are mixed and undergo immediate reaction at room temperature. Thereafter the polyurea is contacted with 1 or more polyether polyols or hydroxyl-containing polyurethane prepolymers, preferably under high shear conditions to disperse the polyurea into the polyether polyol or hydroxyl containing prepolymer. Preferably the isocyanate used to prepare the polyurea is a cycloaliphatic or aliphatic polyisocyanate, as the use of cycloaliphatic and aliphatic isocyanates facilitate handling and stability of the polyurea. Preferably the isocyanate is a diisocyanate. Preferably the polyurea has a urea functionality of about 8 percent or greater, more preferably about 10 percent or greater and most preferably about 15 percent or greater. Preferably the polyurea has a functionality of about 40 percent or less and more preferably about 20 percent or less. Functionality as used herein refers to weight percent of urea groups present in the polyurea based on weight. The polyurea is contained in part B to provide hard segments in the finely cured adhesive. The polyurea further affords rapid viscosity buildup and cure of the adhesive. Preferably the polyurea is a solid to enhance the stability of part B. Preferably, the polyurea is initially dispersed in a polyether polyol and the hydroxyl-containing polyurethane prepolymer is prepared in situ thereafter.

Preferably the polyether polyol that the polyurea is dispersed in is a triol and more preferably a polyoxyalkylene based triol. Preferably, such polyoxyalkylene oxide triol comprises a polyoxypropylene chain with a polyoxyethylene end cap. Such materials are well known in the art and initiators and alkylene oxides which may be used in the preparation of the triol are described hereinbefore. A particularly preferred polyether triol is a 1,2,3-propane triol initiated polyoxypropylene with a polyoxyethylene end cap. Preferably such triol has molecular weight of 2,000 or greater and more preferably 4,500 or greater. Preferably such triol has molecular weight of 8000 or less and more preferably 6,000 or less. Below about 2,000 molecular weight the viscosity of the dispersion is too low and above 8,000 molecular weight it may be too difficult to disperse the polyurea in the triol.

The hydroxyl-containing prepolymer may be prepared by reacting the dispersion of polyurea in polyether triol with a diol and a polyisocyanate under conditions such that a polyurethane prepolymer is prepared and the polyurea does not participate in the reaction in a significant way. The polyether diol is preferably a polyoxyalkylene based polyether. Such polyethers are described hereinbefore in the description of part A of the adhesive composition. More preferably, such diols are polyoxypropylene polyoxyethylene diols. Preferably such polyoxyethylene polyoxypropylene diols contain about 30 percent by weight or greater ethylene oxide groups and more preferably about 60 percent by weight or greater ethylene oxide groups. Preferably such diols contain about 100 percent by weight or less of ethylene oxide moieties, more preferably about 70 parts by weight or less of ethylene oxide moieties. Care must be taken above about 70 weight percent ethylene oxide moieties as the diol becomes very reactive. Under such conditions low catalyst amounts and lower temperatures may be necessary to retain control over the reaction. Preferably the diol used has a molecular weight of about 250 or greater as below about 250 the viscosity of the material may be too low, more preferably the diol has a molecular weight of about 2,000 or greater. Preferably the diol has a molecular weight of about 4,000 or less as above about 4,000 the viscosity may be too high and more preferably the molecular weight is 3,000 or less.

The polyisocyanate used in the advancement is any polyisocyanate useful in preparing a polyurethane prepolymers. Such materials are described hereinbefore in reference to the description of part A of the adhesive of this invention. The relative ratio of hydroxyl groups to isocyanate groups should be such that the resulting prepolymer has no free isocyanate groups as such isocyanate group will react with the polyurea prematurely. Preferably the ratio of isocyanate groups to hydroxyl groups is such that a reasonable advancement occurs. Preferably the equivalent ratio of groups to the hydroxyl groups is 0.1:1 or greater and more preferably about 0.2:1 or greater. The equivalent ratio should not be so high so as to prevent complete reaction of the isocyanate moieties. Preferably the equivalent ratio of isocyanate groups to the hydroxyl groups is 0.95:1 or less, even more preferably 0.8:1.0 or less and more preferably 0.7:1.0 or less.

Preferably aliphatic isocyanates are used as handling of the material is easier and the isocyanates are less reactive thereby allowing greater control of the reaction.

The reactions to prepare the hydroxyl-containing prepolymer may be carried out in the presence of urethane catalysts.

Examples of such catalysts include the stannous salts of carboxylic acids, such as stannous octoate, stannous oleate, stannous acetate, and stannous laureate; dialkyltin dicarboxylates, such as dibutyltin dilaureate and dibutyltin diacetate; tertiary amines and tin mercaptides. Preferably, the reaction to prepare the prepolymer is catalyzed by stannous octoate. The amount of catalyst employed is generally between about 0.005 and about 5 percent by weight of the mixture catalyzed, depending on the nature of the isocyanate.

The prepolymer is preferably prepared by contacting the polyurea dispersed in a triol and the diol in the absence of catalyst and heating the mixture to 48° C. or greater, more preferably 50° C. or greater. The mixture is heated to a temperature of 56° C. or less, more preferably 52° C. or less. The polyisocyanate is then added to the mixture and the mixture is subjected to mixing so as to evenly disperse the polyisocyanate in the reaction mixture. Thereafter the polyurethane catalyst is added. After addition of the catalyst an exotherm generally occurs results, preferably the exotherm is about 58° C. or greater and more preferably 60° C. or greater. Preferably the exotherm is about 70° C. or less more preferably about 58° C. or less. Thereafter plasticizer may be added after the exotherm recedes, that is the temperature drops, to dilute the reactants and quench the reaction. The reaction should be run such that all free isocyanate moieties are reacted with hydroxyl moieties. The reaction should be performed in the absence of atmospheric moisture.

The resulting prepolymer must have free hydroxyl which are capable of reacting with the free isocyanate moieties of the isocyanate-containing prepolymer of part A. The hydroxyl number of the resulting polymer is preferably about 5 or greater and more preferably about 25 or greater. Preferably the hydroxyl number of the resulting prepolymer is about 60 or less and more preferably about 40 or less. The resulting prepolymer with polyurea dispersed therein must be handleable and therefore preferably has a viscosity of about 25,000 centipoise or greater and more preferably about 30,000 centipoise or greater. The hydroxyl containing prepolymer having polyurea dispersed therein preferably has a viscosity of about 45,000 centipoise or less and more preferably about 40,000 centipoise or less. The hydroxyl-containing prepolymer preferably has a molecular weight of about 9,000 or greater more preferably about 15,000 or greater and preferably has a molecular weight of about 22,000 or less more preferably about 18,000 or less.

The polyurea is present in the hydroxyl-containing polyurethane prepolymer dispersion in an amount of about 8 parts by weight of the dispersion or greater, more preferably about 15 parts by weight or greater and most preferably 20 parts by weight or greater. Such polyurea is present in the dispersion in an amount of about 50 parts by weight or less based on the weight of the dispersion, more preferably about 40 parts by weight or less and most preferably 30 parts by weight or less. The hydroxyl-containing prepolymer is present in the dispersion in an amount of about 50 parts by weight or more based on the dispersion, more preferably about 60 parts by weight or more and most preferably about 70 parts by weight or more. The hydroxyl-containing prepolymer is present in the dispersion in an amount based on the weight of the dispersion of about 85 parts by weight or less, even more preferably about 75 parts by weight or less. The plasticizer present in the dispersion is present in an amount of about 0 parts by weight of the dispersion or more preferably about 20 parts by weight or greater and most preferably about 30 parts by weight or greater. The plasticizer is present in the dispersion in an amount of about 40 parts by weight or less based on the weight of the dispersion, and most preferably about 35 parts by weight or less. Parts by weight of the dispersion relates to a dispersion having 100 total parts. The polyurea dispersion in hydroxyl-containing prepolymer is present in part B in an amount of about 30 parts by weight or greater based on the weight of part B and more preferably about 65 parts by weight or greater. The dispersion is present in part B in an amount of about 90 parts by weight or less based on the total weight of part B and more preferably about 70 parts by weight or less.

The curative composition of part B further comprises a latent crosslinking material containing at least one oxazolidine moiety. Such material is present to function as a crosslinker during the final cure of the adhesive. Examples of such latent crosslinking materials include those described in U.S. Pat. No. 4,396,681 and U.S. Pat. Nos. 3,743,626; 4,118,376; 4,192,937; and 5,235,062 relevant parts incorporated herein. In one embodiment, such latent crosslinkers comprise bisoxazolidines which are the reaction product of a diisocyanate with a hydroxy alkyl substituted oxazolidone such as an N-hydroxyethyl oxazolidone. The preferred isocyanates are cycloaliphatic and aliphatic isocyanates such as hexamethylene diisocyanate. A preferred oxazolidone-containing compound is commercially available from Mobay as Hardener OZ which is carbamic acid, 1,6-hexanediyl bis-, bis(2-(2-(1-methylethyl)-3-oxazolidinyl)ethyl) ester.

The oxazolidine-containing compound is present in a sufficient amount to enhance the crosslinking of the polyurethane during curing. If too much is present, there is insufficient work time and if too little is present the open time is too long. If the open time is too long, the drive away time is too long. Preferably the latent crosslinker is used in an amount of about 0.01 parts or greater based on part B, more preferably about 0.02 parts by weight or greater and most preferably about 0.04 parts by weight or greater. Preferably the latent crosslinker is present in an amount of about 0.1 parts by weight or less more preferably about 0.06 parts by weight or less.

The curative composition of part B further comprises a catalyst useful in polyurethane reactions. Such catalysts are well known in the art and include metal salts such as tin carboxylates, organo silicon titanates, alkyl titanates, bismuth carboxylates and the like. A preferred catalyst is bismuth octoate. Such catalyst is preferably used in an amount of about 0.1 parts or greater based on the weight of part B and more preferably about 0.2 parts by weight or greater. Such catalyst is preferably used in an amount of about 1 part by weight based on the weight of part B or less and more preferably 0.6 parts by weight or less.

The curative composition of part B may further comprises a plasticizer. The plasticizers which may be used and the amounts of such plasticizers which may be used are described with respect to part A. The plasticizer may be added all or in part during the preparation of the polyurea dispersed in hydroxyl-containing polyurethane prepolymer or may be added during formulation of part B of the adhesive of this invention.

Part B may further comprise a reinforcing filler and/or clay as described hereinbefore with respect to part A. Additionally B may further comprise antioxidants and UV stabilizers as described hereinbefore.

As used herein all parts by weight relative to part B are based on 100 total parts by weight of part B.

The curative composition of part B may be prepared by contacting the ingredients under conditions such as to blend the material. Such contacting can occur in the standard mixers under conditions well known to those skilled in the art. The curative composition of part B is preferably prepared and stored in a moisture free environment so as to prevent premature curing.

The adhesive composition of the invention is used to bind porous and nonporous substrates together. The two parts of the composition are kept separate until just before use. Just prior to application the two parts are contacted and mixed. Thereafter the mixed adhesive composition is applied to a substrate and the adhesive on the first substrate is thereafter contacted with a second substrate. The ratio of part A to part B should be sufficient to allow curing of the adhesive to give the desired drive away time and lap shear strengths as defined hereinbefore. Preferably the ratio of isocyanate from part A to hydroxyl groups from part B is about 0.5:1 or greater and more preferably about 0.65:1 or greater. Preferably the ratio of isocyanate groups contained in part A to hydroxyl groups in part B is about 0.95:1 or less and more preferably about 0.9:1 or less. Preferably the two parts of the adhesive are formulated such that during mixing the volume of part A to part B side is equal. Although this is not necessary, it greatly simplifies application of the adhesive to substrates. In preferred embodiments, the surfaces to which the adhesive is applied is cleaned and primed prior to application, see for example U.S. Pat. No. 4,525,511, U.S. Pat. No. 3,707,521 and U.S. Pat. No. 3,779,794, relevant parts of all are incorporated herein by reference. Generally the adhesives of the invention are applied at ambient temperature in the presence of atmospheric moisture. Exposure to atmospheric moisture is sufficient to result in curing of the adhesive. Curing can be accelerated by the addition of additional water or by applying heat to the curing adhesive by means of convection heat, microwave heating and the like. Preferably the adhesive of the invention is formulated to provide a working time of 6 minutes or greater more preferably 10 minutes or greater. Preferably the working time is 15 minutes or less and more preferably 12 minutes or less.

Viscosities as described herein are determined according to the following procedure: measured using the Brookfield Viscometer, Model RVT at standard conditions of 72° F. and 50 percent RH. The viscometer is calibrated using silicone oils of known viscosities, which vary between 5,000 cps to 50,000 cps. A set of RV spindles that attach to the viscometer are used for the calibration. All measurements are done using the #5 spindle at a speed of 1 revolution per second for 5 minutes until the viscometer equilibrates. The viscosity corresponding to the equilibrium reading is then calculated using the calibration. Molecular weights as described herein are determined according to the following procedure: determined using the Waters Model 590 Gel Permeation Chromatograph. This unit is connected to a multiwavelength detector and a differential refractometer to measure the elution volume. A column of styrogel is used for the size exclusion and it can determine molecular weights from 250 to 50,000. The molecular weight of the prepolymer is then determined by measuring the elution volume through this column using tetrahydrofuran as the eluting solvent. The molecular weight is then calculated from a calibration curve of molecular weight vs. elution volume obtained from a polystyrene polyethylene glycol column.

ILLUSTRATIVE EMBODIMENTS OF THE INVENTION

The following examples are provided to illustrate the invention, but are not intended to limit the scope thereof. All parts and percentages are by weight unless otherwise indicated.

EXAMPLE 1

A polyether polyurethane prepolymer with low degree of branching was prepared by mixing 363.68 g of a polyoxypropylene diol having an average molecular weight of 2000 commercially available under the trade name "PPG 2025" with 527.04 g of a polyoxypropylene triol having an average molecular weight of 4500 and commercially available under the trade name "Poly G 85-36." Mixing was carried out in a reactor by heating the mixture to 55° C. 160.6 g of diphenylmethane-4,4'-diisocyanate and 0.17 g of stannous octoate was added to the mixture. The whole mixture was then reacted for one hour. Finally, 525.44 g of a plasticizing agent diallyl phthalate was added to the mixture and the mixing continued for one hour.

EXAMPLE 2

An adhesive composition was prepared using 540.32 g of prepolymer of Example 1 in a planetary mixer, degassed for 20 minutes, 213.3 g of carbon black and 60 g of clay was added to the mixer and mixed for 20 minutes under vacuum. Finally 1.9 g of dimorpholino-diethyl ether was added as a catalyst to the mixture and mixed for another 20 minutes and packaged in tubes.

EXAMPLE 3

An adhesive composition was prepared using 270.16 g of prepolymer of Example 1 in a planetary mixer, degassed for 20 minutes. 136.65 g of carbon black was added to the mixer and mixed for 20 minutes under vacuum. Finally, 0.95 g of dimorpholinodiethyl ether was added as a catalyst to the mixture and mixed for another 20 minutes and packaged in tubes.

EXAMPLE 4

An adhesive composition was prepared using 568 g of prepolymer of Example 1 in a planetary mixer, degassed for 20 minutes. 229.6 of carbon black was added to the mixer and mixed for 20 minutes under vacuum. Finally, 2.4 g of dimorpholinodiethyl ether and 0.4 g of bismuth octoate was added as a catalyst to the mixture and mixed for another 20 minutes and packaged in tubes.

EXAMPLE 5

A polyurea dispersed polyether polyurethane prepolymer was synthesized using 660.25 g of a polyoxyalkylate diol available commercially under the trade name "Poly G55-56" having an average molecular weight of 2000 and 607.95 g of a polyurea dispersed polyoxyalkylate triol available under the trade name "Desmophen 1920." This mixture was stirred and heated to 55° C. at which time 77.17 g of diphenylmethane-4,4'-diisocyanate and 1.2 g of stannous octoate was added and mixed for 30 minutes. Finally, 404.25 g of a plasticizing agent dialkyl phthalate was added and the mixture stirred for another 30 minutes. The resultant prepolymer is a viscous material with a viscosity of 33,000 cps and zero free isocyanate functionalities.

EXAMPLE 6

A curative composition was prepared using 270 g of the prepolymer in Example 5 mixed with 0.325 g of a latent polyamino alcohol based on urethane bisoxazolidine commercially available under the trade name "Hardener OZ" as a crosslinking agent for 10 minutes under vacuum. 0.3 g of bismuth octoate was then added to this mixture and stirred for another 15 minutes. 60 g of carbon black and 60 g of clay was added to this mixture and mixed for 20 minutes under vacuum. The mixture was further mixed for another 20 minute after which it was packaged in tubes.

EXAMPLE 7

A polyurea dispersed polyether polyurethane prepolymer was synthesized using 512 g of a polyoxyalkylate diol available commercially under the trade name "VORANOL 5287" having an average molecular weight of 1000 and 1024 g of a polyurea dispersed polyoxyalkylate triol, available under the trade name "DESMOPHEN 1920." This mixture was stirred and heated up to 55° C. at which time 64 g of diphenylmethane-4,4'-diisocyanate and 0.16 g of stannous octoate was added and mixed for 30 minutes. The resultant prepolymer is a viscous material with zero free isocyanate functionalities.

EXAMPLE 8

280 g of the prepolymer in Example 7 was transferred into a planetary mixer and degassed for 10 minute under vacuum for 15 minutes. 96 g of carbon black was added to this mixture and mixed for 20 minutes under vacuum. The mixture was further mixed for another 20 minutes after which it was packaged in tubes for dispensing.

EXAMPLE 9

560 g of the prepolymer in Example 7 was transferred into a planetary mixer and degassed for 10 minutes. 0.12 g of Hardener OZ was then added to the prepolymer and mixed under vacuum for 15 minutes. 192 g of carbon black was added to this mixture and mixed for 20 minutes under vacuum. The mixture was further mixed for another 20 minutes after which it was packaged in tubes for dispensing.

EXAMPLE 10

336 g of the prepolymer in Example 7 was transferred into a planetary mixer and degassed for 20 minutes. 0.14 g of Hardener OZ was then added to the prepolymer and mixed under vacuum for 15 minutes. 115.2 g of carbon black was added to this mixture and mixed for 20 minutes under vacuum. The mixture was further mixed for another 20 minutes after which it was packaged in tubes for dispensing.

EXAMPLE 11

A polyether polyurethane prepolymer was synthesized using 463.2 g of a polyoxyalkylate diol available commercially under the trade name "Poly G55-28" having an average molecular weight of 2000 and 615.52 g of a polyoxyalkylate triol available under the trade name "Poly G85-36." This mixture was stirred and heated up to 55° C. at which time 41.28 g of diphenylmethane-4,4'-diisocyanate and 0.32 g of stannous octoate was added and mixed for 30 minutes. Finally, 479.68 g of a plasticizing agent dialkyl phthalate was added and the mixture stirred for another 30 minutes. The resultant prepolymer is viscous material with zero free isocyanate functionalities.

EXAMPLE 12

581.84 g of the prepolymer in Example 11 was transferred into a planetary mixer and degassed for 10 minutes. 2.16 g of bismuth octoate was then added to the prepolymer and mixed under vacuum for 15 minutes. 192 g of carbon black was added to this mixture and mixed for 20 minutes under vacuum. The mixture was further mixed for another 20 minutes after which it was packaged in tubes for dispensing.

EXAMPLE 13

Material packaged in tubes prepared in Examples 2 and 6 were inserted into a high speed mixing electric gun with the appropriate dynamic mixing heads. The material in both tubes were extruded at high speeds at a 1:1 ratio on a volume basis using this gun and the cure rate for this adhesive was 140 psi (964 kPa) within an hour, determined by a quick adhesion test described below.

For determining cure rate a 1×¼' (2.54 cm×0.62 cm) thick bead is extruded on a primed glass plate. A metal plate which is also primed is then placed on top of the extruded bead. The assembly is allowed to cure at 72° F. (22° C.) and 50% R.H. for 60 minutes. The plates are then separated by pulling the two plates perpendicular to the plane of the bead one hour after assembly. The curing rate is recorded in psi at the appropriate time.

EXAMPLE 14

Comparison of Lap Shear Strength

| Adhesive | Ex. 2 | Ex. 4 | Ex.4 | Ex. 4 |
|---|---|---|---|---|
| Curative | Ex. 6 | Ex. 8 | Ex. 9 | Ex. 10 |
| % Bismuth Octoate | 0.15 | 0.05 | 0.05 | 0.05 |
| % Hardener OZ | 0.08 | 0.05 | 0.015 | 0.03 |
| Working time (minutes) | 12 | 17 | 15 | 8 |
| psi in 30 minutes | 27.5 | 34 | 68 | 75 |
| kPa | 189 | 234 | 469 | 517 |
| psi in 60 minutes | 166 | 82 | 129 | 125 |
| kPa | 1144 | 565 | 889 | 861 |
| psi in 120 minutes | 373 | 185 | 175 | 216 |
| kPa | 2570 | 1275 | 1205 | 1488 |

EXAMPLE 15

Comparison of Lap Shear Strength between dispersion triol used in Example 6 and conventional triol used in Example 12.

| Adhesive | Ex. 2 | Ex. 3 |
|---|---|---|
| Curative | Ex. 6 | Ex. 12 |
| psi in 30 minutes | 27.5 | 19.18 |
| kPa | 190 | 132 |
| psi in 60 minutes | 166 | 74.98 |
| kPa | 1144 | 517 |
| psi in 120 minutes | 373 | 113.77 |
| kPa | 2570 | 784 |
| Working time (minutes) | 12 | 7 |

What is claimed is:

1. A process for binding two substrates together which comprises:

1 contacting a portion of part A with a portion of part B of the adhesive comprising:

A. as a first part a polyurethane prepolymer having reactive isocyanate moieties;
B. as a second part a curative composition comprising:
  i. a polyurea comprising the reaction product of a polyamine and a polyisocyanate dispersed in a polyether polyol-based polyurethane prepolymer having reactive hydroxyl moieties, and optionally, containing a plasticizer;
  ii. a compound having at least one oxazolidine moiety capable of reacting with an isocyanate under curing conditions; and
  iii. a catalyst capable of catalyzing the reaction of isocyanate and hydroxyl moieties in the presence of moisture, 2 applying the mixture of part A and part B to a first substrate; and 3 contacting a second substrate with the mixture of part A and part B previously applied to the first substrate under conditions such that the mixture cures and binds the first substrate to the second substrate.

2. The process of claim 1 wherein the polyurethane prepolymer containing reactive hydroxyl moieties of part B comprises the reaction product of a polyoxyalkylene triol, a polyoxyalkylene diol and a polyisocyanate and which prepolymer demonstrates a viscosity of about 25,000 to about 45,000 centipoise.

3. The process of claim 2 wherein the dispersion of part B comprises about 8 to 50 parts by weight based on the dispersion of polyurea, about 50 to about 85 parts by weight based on the dispersion of polyurethane prepolymer with reactive hydroxyl moieties, and about 0 to about 40 parts by weight of plasticizer.

4. The process of of claim 3 wherein part A further comprises a reinforcing filler, clay, a catalyst for a polyurethane moisture cure reaction and a plasticizer.

5. The process of claim 4 wherein part B further comprises a reinforcing filler, clay and plasticizer.

6. The process according to claim 5 wherein the adhesive composition comprises:

A i) from about 55 to about 83 parts by weight of isocyanate containing polyurethane prepolymer based on the weight of part A;
ii) from about 15 to about 25 parts by weight of reinforcing filler based on the weight of part A;
iii) from about 1 to about 20 parts by weight of clay based on the weight of part A;
iv) from about 0.1 to about 5.0 parts by weight of a polyurethane catalyst based on the weight of part A;
v) from about 0 to about 40 parts by weight of plasticizer based on the weight of part A;

wherein the total number of parts by weight of part A is 100:

B i) from about 30 to about 80 parts by weight of polyurea dispersed in polyurethane prepolymer having reactive hydroxyl moieties based on the total parts of part B
ii) from about 0.01 to about 0.1 parts by weight of an oxazolidone-containing compound based on the total parts of part B;
iii) from about 0.1 to about 5.0 parts of catalyst based on the total parts of part B;
iv) from about 15 to about 25 parts by weight of reinforcing filler based on the total parts of part B;
v) from about 1 to about 20 parts by weight of clay based on the weight of part B
vi) from about 0 to about 40 parts by weight of plasticizer based on the total weight of part B wherein the total parts of part B is 100;

wherein the amount of part A and part B are present such that the ratio of isocyanate moieties to hydroxy moieties is from about 1.0:0.95 to 1.0:0.5.

7. The process of claim 6 wherein the first substrate is a window glass and the second substrate is a window frame.

8. The process of claim 7 wherein the second substrate is the window frame of an automobile.

* * * * *